US006401070B1

(12) United States Patent
McManus et al.

(10) Patent No.: US 6,401,070 B1
(45) Date of Patent: Jun. 4, 2002

(54) SYSTEM AND METHOD FOR PROVIDING HOUSE PRICE FORECASTS BASED ON REPEAT SALES MODEL

(75) Inventors: Douglas A. McManus, Bethesda, MD (US); Sol T. Mumey, McLean, VA (US)

(73) Assignee: Freddie Mac, Vienna, VA (US)

( * ) Notice: Subject to any disclaimer, the term of this patent is extended or adjusted under 35 U.S.C. 154(b) by 0 days.

(21) Appl. No.: 09/115,831

(22) Filed: Jul. 15, 1998

Related U.S. Application Data

(63) Continuation of application No. 08/730,289, filed on Oct. 11, 1996.
(60) Provisional application No. 60/059,327, filed on Sep. 17, 1997, provisional application No. 60/059,194, filed on Sep. 17, 1997, and provisional application No. 60/059,328, filed on Sep. 17, 1997.

(51) Int. Cl.[7] .............................................. G06F 17/60
(52) U.S. Cl. .............................. 705/1; 705/10; 705/35; 705/37
(58) Field of Search ................................ 705/1, 10, 35, 705/37

(56) References Cited

U.S. PATENT DOCUMENTS

| | | | | |
|---|---|---|---|---|
| 5,361,201 A | * | 11/1994 | Jost et al. ...................... | 705/35 |
| 5,414,621 A | * | 5/1995 | Hough .......................... | 705/10 |
| 5,500,793 A | * | 3/1996 | Deming, Jr. et al. .......... | 705/37 |
| 5,680,305 A | * | 10/1997 | Apgar .......................... | 705/10 |
| 5,857,174 A | * | 1/1999 | Dugan .......................... | 705/1 |

OTHER PUBLICATIONS

Lew Sichelman; "Determining home's proper selling price", National Mortgage News, Sep. 29, 1997.*
Clapp et al. "Estimating Time Adjustments with Sales Prices and Assesed Values", The Appraisal Journal, Jul. 1996.*
Cocheo, "Appraisals: A Trade under Renovation", ABA Banking Journal Feb. 1996.*
Fritz Wayne C., "Real Estate Appraisal Cocepts", Economic development Review, Winter 1996.*
Detweiler et al., "Computer Assisted Real Estate Appraisal", The Appraisal Journal, Jan. 1996.*
Janavicius John M., "A Formula for Tax Appraisal of Mult–Tenant Properties", The Appraisal Journal, Oct. 1996.*
Jesse M. Abraham and William S. Schauman, Secondary Mortgage Markets/Winter 1990/1991, "Measuring House Price Inflation, Sizing Up Alternative Methods," pp. 8–12.
G.A.F. Seber and C.J. Wild, "Nonlinear Regression," Department of Mathematics and Statistics, University of Auckland, New Zealand, John Wiley & Sons (1989), pp. 481–486.
Martin J. Bailey, Richard F. Muth, and Hugh O. Nourse, American Statisical Association Journal, Dec. 1963, "A Regression Method for Real Estate Price Index Construction," pp. 933–942.
Peter Chinloy, Man Cho, and Isaac F. Megbolugbe, The Journal of Real Estate Finance and Economics, "Appraisals, Transaction Incentives, and Smoothing," pp. 89–111 (1997).
Evaluation and Combination of Forecasts, Chapter 8.
Econometrics, G.S. Maddala, pp. 314–317 (1977).
Economic Forecasting: An Introduction, pp. 85–107 (1994).
Forecasting Economic Time Series, pp. 265–276 (2d ed., 1986).

* cited by examiner

*Primary Examiner*—V. Millin
*Assistant Examiner*—Jagdish N Patel
(74) *Attorney, Agent, or Firm*—Finnegan, Henderson, Farabow, Garrett & Dunner, L.L.P.

(57) ABSTRACT

Method and system for estimating real estate property values based on repeat sales model. The method estimates the price index using property value data from refinance transactions, as well as from purchase transactions. In so estimating, the method compensates for the transaction bias arising from using data from refinance transactions, which may exhibit incentive and selection biases. The property at issue may be estimated based on the so-computed price index. The price index and/or the bias component may be estimated using nonparametric functions.

102 Claims, 5 Drawing Sheets

SYSTEM AND METHOD FOR PROVIDING HOUSE PRICE FORECASTS BASED ON REPEAT SALES MODEL

RELATED APPLICATIONS

This application is based on a provisional application, Ser. No. 60/059,327, entitled METHOD FOR FORECASTING HOUSE PRICE VALUES USING SPLINE TECHNIQUES TO ESTIMATE REFINANCE BIAS COMPONENT OF REPEAT SALES PROCESS, filed Sep. 17, 1997, which is hereby incorporated by reference. This application is also based on provisional applications, Ser. No. 60/059,194, entitled METHOD FOR FORECASTING HOUSE PRICE VALUES USING REFINANCE AND PURCHASE TRANSACTIONS, filed Sep. 17, 1997, and Ser. No. 60/059,328, entitled METHOD FOR FORECASTING HOUSE PRICE VALUES USING NONPARAMETRIC ESTIMATION TECHNIQUES, filed Sep. 17, 1997, and a continuation of U.S. patent application, Ser. No. 08/730,289, entitled METHOD FOR COMBINING HOUSE PRICE FORECASTS, filed Oct. 11, 1996, all of which are hereby incorporated by reference.

BACKGROUND OF THE INVENTION

A. Field of the Invention

The present invention relates generally to estimating property values, and more particularly, to providing property value estimates based on a repeat sales model.

B. Description of the Prior Art

Financial institutions and businesses involved with sales of property have long tried to estimate values of property accurately. Accurate estimation serves many important purposes. For example, financial institutions use property value estimates as one of the key factors in approving mortgage applications for real estate sales. Relying on the soundness of the estimate, financial institutions accept the risk of lending large sums of money and typically attach the property as security for the transaction. Accordingly, the accuracy of estimated value of the real estate entity is critical.

There are several ways of forecasting house prices. See, for example, J. M. Abraham and W. S. Schauman's article, "Measuring House Price Inflation," Secondary Mortgage Markets (Winter 1990/91), which is incorporated herein by reference, for various different approaches using an overall price index of the real estate market at issue, such as the median sale price index (essentially a median average of all the properties sold in a market) and the hedonic index (calculating the house price increases by estimating and tracking the average prices of various features of a house, such as the square footage and the presence or absence of the garage).

One such technique is referred to as the repeat sales approach. The data used in the repeat sales model comprise successive selling prices and the sale dates for the same property. In essence, this approach finds the average rate of property appreciation in each period that gives the best statistical fit to all the overlapping holding periods. By using the same house for both prices, the repeat sales model eliminates the bias in price changes that are not due to the true house price change, but due to external factors such as consumer trends for bigger houses.

This basic repeat sales model can be improved by the use of data from refinance transactions, in addition to data from purchase transactions, in forming repeat sales forecasts, thereby increasing the size of the estimation sample and the timeliness of the evaluation sample. However, the conventional repeat sales model treated the data from refinance and purchase transactions identically, and the potential gains of a larger sample size were outweighed by a transaction type bias introduced into the forecasts. In short, the absence of an adequate control for transaction type could cause the forecasts of the repeat transactions model to exhibit material bias, thereby reducing their usefulness for business purposes.

Another shortcoming with the conventional repeat sales method is that the price index used was estimated discretely, as a series of numbers which represent constant house price levels at particular time intervals (typically quarters). This method produces counter-intuitive results: first, house price appreciation is constant during the discrete intervals (here represented as quarters); and second, there are 'jumps' in the appreciation at the end of each quarter, and thus, the path of house price appreciation is not continuous.

SUMMARY OF THE INVENTION

In accordance with the purpose of the invention, as embodied and broadly described herein, the invention comprises: accessing, for a plurality of properties in a database, a set of property value data corresponding to each of the plurality of properties, wherein each property has two or more property value data, each property value data derived from a refinance or a purchase transaction; and determining, based on the set of property value data for the plurality of properties, a time-varying price index corresponding to the overall change over time of the values of the plurality of properties, wherein the price index takes into account a transaction type bias between the property value data derived from refinance transactions and the property value data derived from purchase transactions.

In another aspect, the invention comprises: means for accessing, for a plurality of properties in a database, a set of property value data corresponding to each of the plurality of properties, wherein each property has two or more property value data, each property value data derived from a refinance or a purchase transaction; and means for determining, based on the set of property value data for the plurality of properties, a time-varying price index corresponding to the overall change over time of the values of the plurality of properties, wherein the price index takes into account a transaction type bias between the property value data derived from refinance transactions and the property value data derived from purchase transactions.

In a further aspect of the invention the invention comprises an article of manufacture capable of configuring a data processor to estimate the value of a real estate property, the article comprising program code to cause the data processor to perform the steps of: accessing, for a plurality of properties in a database, a set of property value data corresponding to each of the plurality of properties, wherein each property has two or more property value data, each property value data derived from a refinance or a purchase transaction; and determining, based on the set of property value data for the plurality of properties, a time-varying price index corresponding to the overall change over time of the values of the plurality of properties, wherein the price index takes into account a transaction type bias between the property value data derived from refinance transactions and the property value data derived from purchase transactions.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

In the figures.

DETAILED DESCRIPTION

Figure 1:
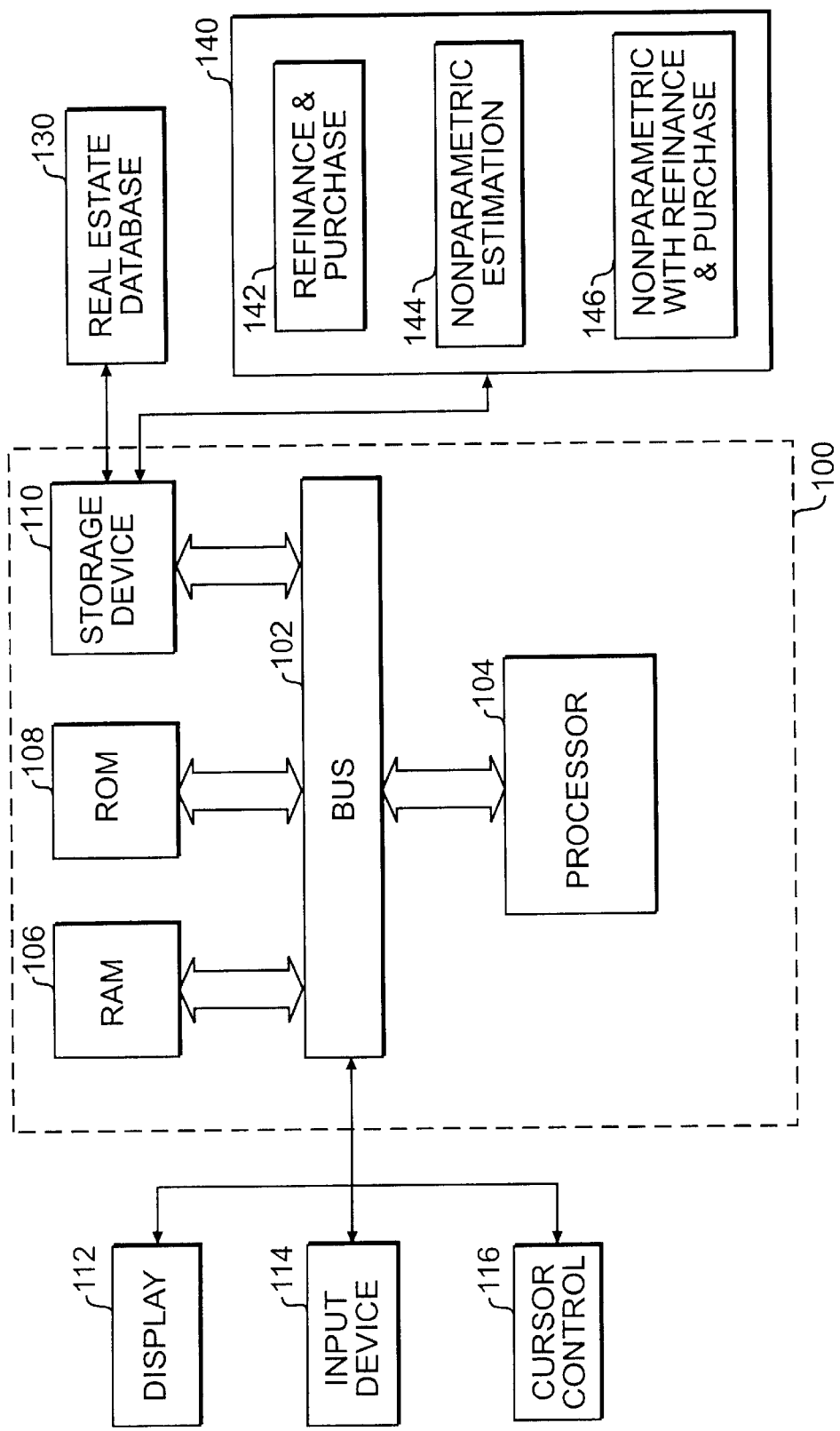
FIG. 1 is an overview of a property value estimation system consistent with an implementation of the present invention.

Reference will now be made in detail to the systems and methods consistent with implementations of the present invention, examples of which are illustrated in the accompanying drawings. Where appropriate, the same reference numerals refer to the same or similar elements. The appended claims define the scope of the invention, and the following description does not limit that scope.

The systems and methods consistent with implementations of the present invention obviate the limitations and disadvantages of traditional repeat sale method for forecasting house price values. The systems and methods estimate real estate property values based on repeat sales model. The price index is estimated using property value data from refinance transactions, as well as from purchase transactions. In so estimating, the systems and methods provide for ways, such as using dummy variables, to compensate for the transaction bias arising from using data from refinance transactions, which may exhibit incentive and selection biases. The property at issue may be estimated based on the so-computed price index. The price index and/or the bias component may be estimated using nonparametric techniques.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

FIG. 1 illustrates the system architecture for a computer system with which systems consistent with the present invention may be implemented. Computer system 100 includes a bus 102 or other communication mechanism for communicating information, and a processor 104 coupled with bus 102 for processing information. Computer system 100 also includes a main memory, such as a random access memory (RAM) 106 or other dynamic storage device, coupled to bus 102 for storing information and instructions to be executed by processor 104. RAM 106 also may be used to store temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Computer system 100 accesses data from real estate database 130 and executes one or more sequences of one or more instructions contained in main memory 106. Both the data from real estate database 130 and the instructions may be read into main memory 106 from another computer-readable medium, such as storage device 110. As show in FIG. 1, the instructions comprise the repeat sales model programs used in the systems and methods consistent with implementations of the present invention: refinance and purchase transactions 142; nonparametric estimation 144; and nonparametric with refinance and purchase transactions 146, each of which is described in detail below. Execution of the sequences of instructions contained in main memory 106 causes processor 104 to perform the process steps described herein. In an alternative implementation, hard-wired circuitry may be used in place of or in combination with real estate database and/or software instructions to implement the invention. Thus implementations of the invention are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, a carrier wave as described hereinafter, or any other medium from which a computer can read.

Figure 2:
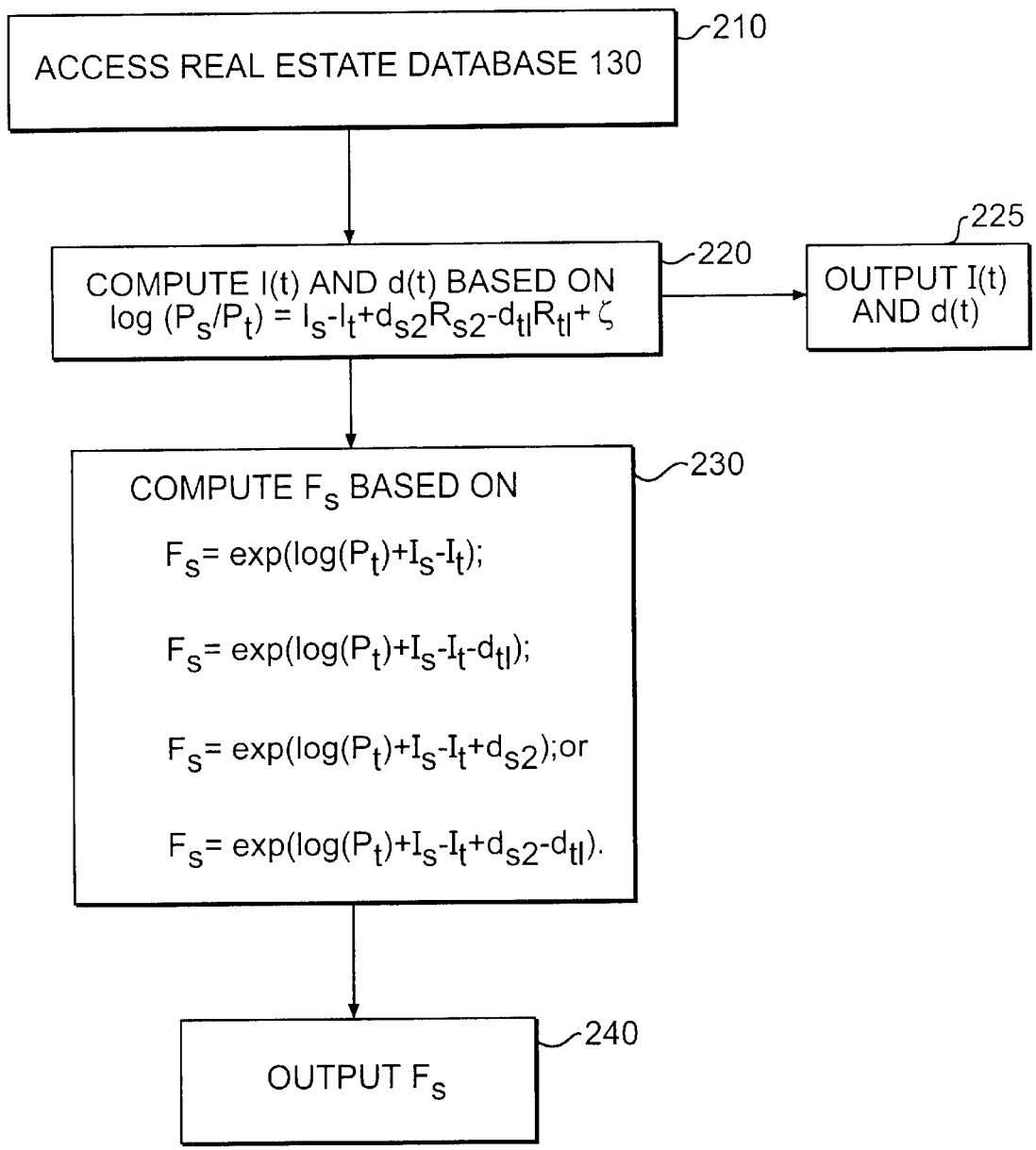
FIG. 2 is a flow chart of the process for the property value estimation consistent with an implementation of the present invention.

FIG. 2 is a flow chart of the steps used to implement the repeat sales forecast model, accounting for the differences between refinance and purchase transactions. As discussed above, if the differences between refinance and purchase transactions are not adequately accounted for by the model, then these potential gains can be outweighed by a transaction type bias introduced into the forecasts.

There are qualitative differences between house price data derived from purchase transactions and from refinance transactions. Purchase transactions typically involve arms-length arrangements in which the incentives of the parties will tend to result in an unbiased sales price, and the information of the three parties (buyer, seller and appraiser) will tend to result in greater accuracy in ascertaining the value of the property. Refinance transactions, on the other hand, have valuation based solely on an appraisal and consequently are subject to several sources of bias. Incentive biases in appraisals arise because appraisers are motivated to arrive at valuations that can make the refinance transaction successful. Selection biases arise because, particularly in a down market, the properties that are eligible for refinance are more likely to be those that have appreciated relative to the market as a whole.

An implementation of the present invention takes into account the bias introduced by the data from the refinance transactions.

When the differences between transactions (that is, between purchase and refinance transactions) are not accounted for, the repeat sales model can be expressed as an equation of the following form:

(1) $\log(P_s/P_t) = I_s - I_t + v$ where $P_t$ is the first transaction price for a given property, $P_s$ is the second transaction price for the same property, $I_t$ is the log index value at time t, $I_s$ is the log index value at time s, and v is the error term representing the deviation in price of the particular property from the model. Point forecasts at time s based on a transaction value at time t from this equation are made using the following equation:

(2) $F_s = \exp(\log(P_t) + I_s - I_t)$

However, this approach does not adequately account for the differences in the transaction type in estimation and evaluation. Consequently, the estimates of the index L, will exhibit bias, which will in turn be reflected in biased forecasts.

In systems and methods consistent with one implementation of the present invention, the usual set of repeat sales regressors is augmented by a set of dummy variables. The dummy variables are created from interacting the date of transaction with the transaction type (refinance vs. purchase) for both transaction dates. Specifically, the model takes the form:

(3) $\log(P_s/P_t) = I_s - I_t + d_{s2} R_{s2} - d_{r1} R_{r1} + \xi$

Where $P_t$ is the first transaction price, $P_s$ is the second transaction price, $I_t$ is the log index value at time t, $R_{r1}$ is one if the first transaction is a refinance and zero otherwise, $R_{s2}$ is one if the second transaction is a refinance and zero otherwise, $d_{r1}$ is coefficient representing the first transaction refinance bias at time t, $d_{s2}$ is coefficient representing the second transaction refinance bias at time s, and $\xi$ is the error term. In essence, the refinance bias terms measure the difference in appreciation between purchase and refinance transactions at the two dates. The $d_{r1}$ coefficients can be thought of as measuring the incentive bias and the $d_{s2}$ coefficients as measuring the combined selection and incentive bias. Thus, this implementation of the present invention allows for time varying differences between refinance and purchase transactions, thereby improving forecast accuracy.

In steps 210 and 220 of FIG. 2, I(t) (hence $I_s$ and $I_t$) and d(t) (hence $d_{s2}$ and $d_{r1}$) may be calculated based on equation (3) above, using the standard regression technique. For example, Arthur S. Goldberger, "Economic Theory," Chapters 4 and 5, John Wiley & Sons (1964), describes such a technique. The resulting I(t) and d(t) may be outputted on display 112 or to storage device 110 of FIG. 1 (step 225).

In one implementation consistent with the present invention, the estimation sample used to compute I(t) and d(t) comprise three types of data: purchase to purchase, purchase to refinance, and refinance to purchase. In other words, data from refinance to refinance transactions are not used in the preferred embodiment. An arms-length transaction is preferably used for at least one value.

Once I(t) and d(t) are computed, the house price forecasts can be made using a formula that depends on the nature of the type of an earlier transaction. If it is known that at time t, the property in question sold for $P_t$ then the house price forecast for time s, $F_s$, is given by (step 230):

(4) $F_s = \exp(\log(P_t) + I_s - I_t)$.

If it is known that at time t, the property in question was refinanced and was appraised for $P_t$, then the house price forecast for time s is given by (step 230):

(5) $F_s = \exp(\log(P_t) + I_s - I_t - d_{r1})$.

Finally, there are cases in which the selection effects of a refinance transaction need to be included. For example, in evaluating a pool of refinance transactions funded in a given quarter, this pool would be subject to a refinance selection effect. In such a case, the forecast of the house value for a refinance transaction at time s using a previous sales price transaction from time t, $P_t$ is given by (step 230):

(6) $F_s = \exp(\log(P_t) + I_s - I_t + d_{s2})$ and using a previous refinance transaction from time t, $P_t$, the forecast is (step 230):

(7) $F_s = \exp(\log(P_t) + I_s - I_t + d_{s2} - d_{r1})$.

The resulting $F_s$ may be outputted on display 112 or to storage device 110 of FIG. 1 (step 240).

In sum, this implementation of the present invention introduces a set of time varying transactions effects into repeat sales estimation procedures. This serves to control for transactions bias while offering the advantage of a larger sample size.

Figure 3:
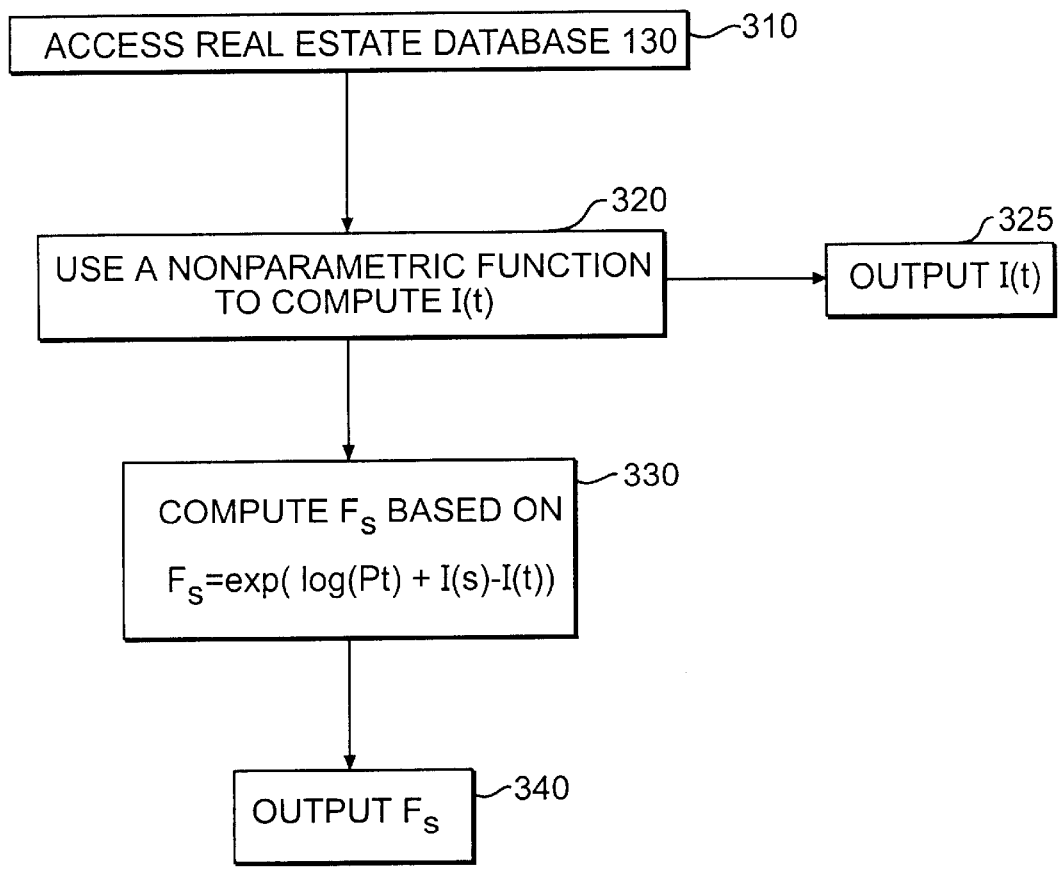
FIG. 3 is a flow chart of the process for the property value estimation consistent with another implementation of the present invention.

FIG. 3 shows a flow chart illustrating another implementation of the present invention. This implementation of the present invention utilizes nonparametric estimation techniques to obviate the limitations and disadvantages of traditional repeat sales method for forecasting house price values.

The repeat sales method explicitly models the house price level over time. Prior to this invention, the price index used for forecasts has been estimated discretely, as a series of numbers which represent constant house price levels at particular time intervals (typically quarters). See FIG. 5, wherein the conventional, discrete index is shown as a dotted line. There are several disadvantages of the conventional approach. First, a temporal aggregation bias is introduced by treating house price inflation as constant within a time interval. Second, this method takes as fixed the tradeoff between the variability of the estimates and the bias in the fineness of time intervals used. For example, it might be better to use wider intervals over time periods with relatively few observations and conversely, tighter intervals over time periods with a large number of observations. This implementation of the present invention mitigates both of these limitations by using techniques from nonparametric functional estimation.

Figure 5:
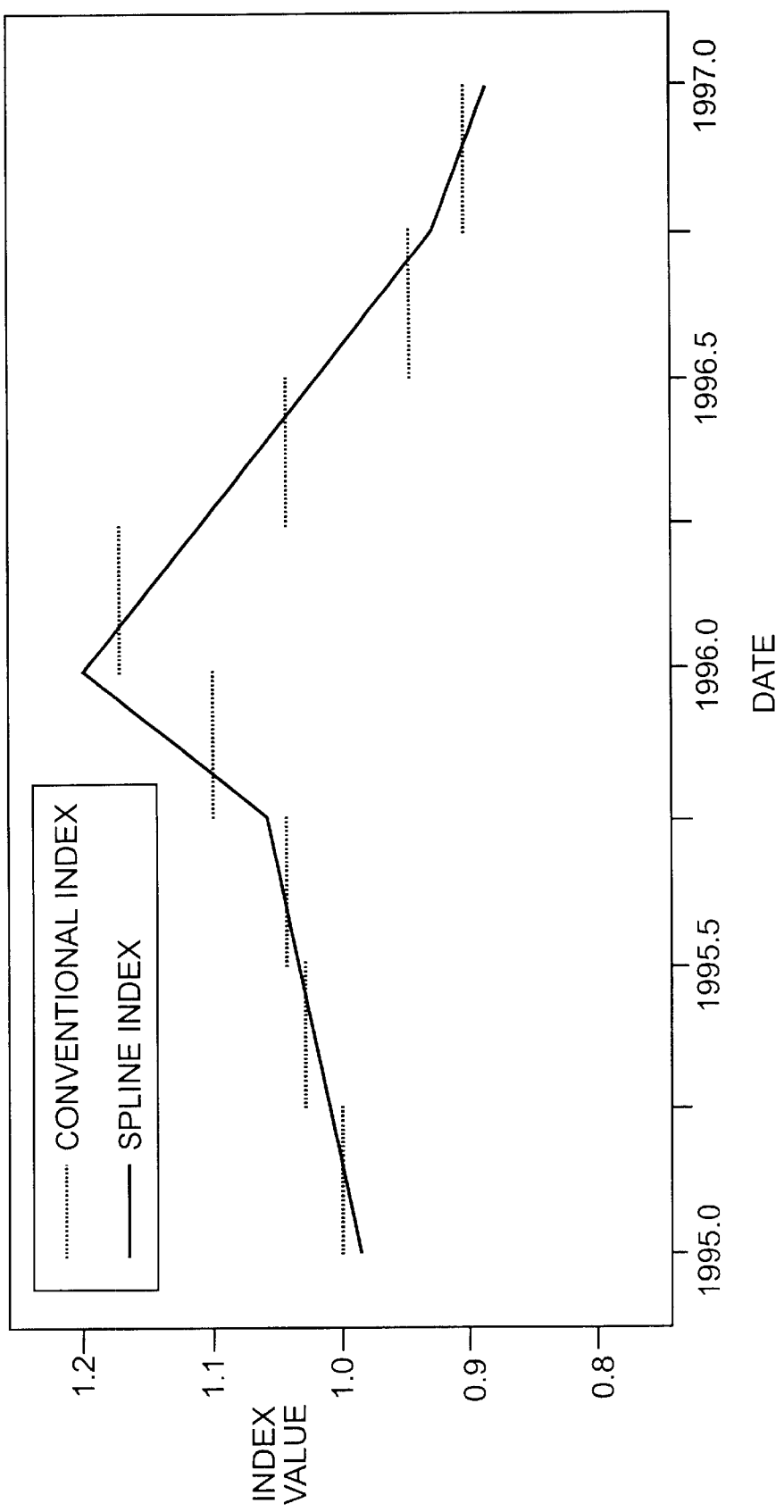
FIG. 5 is a graph showing a comparison between a conventional estimation and an estimation consistent with one implementation of the present invention.

For the purposes of explaining this implementation of the present invention, consider FIG. 5. The conventional repeat sales method discretely estimates house price appreciation for each time interval. As can be seen, the conventional method produces several counter-intuitive results: first, house price appreciation is constant during the discrete intervals (here represented as quarters); and second, there are 'jumps' in the appreciation at the end of each quarter, and thus, the path of house price appreciation is not continuous.

These limitations of the conventional method can be overcome by the introduction of a nonparametric estimator of the repeat sales index function, such as using a spline function. Systems consistent with the present invention use nonparametric estimation methods to consistently estimate a function whose shape is unknown. There are many nonparametric estimators that can be employed to estimate the repeat sales house price index function I(t). While the current implementation uses one such nonparametric estimators—a linear spline—systems consistent with the present invention may also use all nonparametric estimators of the index function in repeat sales estimation. The linear spline approximates the index function using the following formula:

$$(8)\ I(t)=a+b_0 t+b_1 \max[0, t-k_1]+b_2 \max[0, t-k_2]+\ldots+b_n \max[0, t-k_n]$$

with knot points at $(k_1, \ldots, k_n)$ and coefficients $(a, b_0, \ldots, b_n)$. The implemented nonparametric functional estimator is referred to as a linear regression spline, which estimates the unknown index function I(t). As the number of knots increases (n→∞) and $\{k_i\}^n_{i=1}$ becomes dense in the domain of the function, the approximating class of $I_s$ has the property that over compact domains, $\min_b \|I_s(t)-I(t)\| \to 0$. And thus under suitable technical conditions, if the number of knot points is allowed to increase with sample size, I(t) can be consistently estimated. For additional information on spline estimation, see C. de Boor, "A Practical Guide to Splines," Springer-Verlag (1978) and T. J. Hastie and R. J. Tibshirani, "Generalized Additive Model," Chapman and Hall (1990), which are hereby incorporated by reference.

In particular, a spline function can yield a path of the form depicted by the solid curve in FIG. 5. The points at which the curve changes slope are called "knot points." The method of the present invention allows the placement of the knots to be determined by the data. To enhance the performance of the spline, endogenous knots selection is used. Thus, in estimating the model, a grid of potential knot points is specified. Knot points from the grid are used if their use increases the fit of the model beyond a set threshold. As a result, knots will typically be finely distributed in time intervals where there is either a large sample or strong nonlinear changes in the index. Conversely, knots typically will be coarsely distributed in time intervals where there is either a small sample or the index is well approximated by a linear form.

This strategy both greatly diminishes the bias associated with the constant house prices within a time interval in the conventional approach and the placement of the knots allows knots to be used only when they are needed.

In addition to the improvements due to mitigating problems with temporal aggregation, this invention allows the index to be estimated at a lower level of geographic aggregation. The smaller the region used in estimation the better the model can capture local movements in house prices. Because the invention allows more efficient use of data, it permits more geographically disaggregated indexes to be estimated, improving forecast accuracy.

The model is estimated in first differences as given as:

$$(9)\ \log(P_s/P_t)=b_0(s-t)+b_1\{\max[0, s-k_1]-\max[0, t-k_1]\}+\ldots+b_n\{\max[0, s-k_n]-\max[0, t-k_n]\}+u$$

Thus, note that the vector of coefficient b is identified, however the parameter a is not. This is analogous to the need to specify a base year to achieve identification of the index function in standard repeat sales estimation.

Similar to the implementation of refinance and purchase described above, in steps 310 and 320 of FIG. 3, $b_0 \ldots b_n$ may be calculated based on equation (9) above, using the standard regression technique. For example, Arthur S. Goldberger, "Economic Theory," Chapters 4 and 5, John Wiley & Sons (1964), describes such a technique. The resulting I(t) or $b_0 \ldots b_n$ may be outputted on display 112 or to storage device 110 of FIG. 1 (step 325).

Point forecasts at time s based on a transaction value at time t from this equation are made using the following equation (step 330):

$$(10)\ F_s=\exp(\log(P_t)+I(s)-I(t))$$

or equivalently, $$(11)\ F_s=\exp(\log(P_t)+b_0(s-t)+b_1\{\max[0, s-k_1]-\max[0, t-k_1]\}+\ldots+b_n\{\max[0, s-k_n]-\max[0, t-k_n]\})$$

The resulting $F_s$ may be outputted on display 112 or to storage device 110 of FIG. 1 (step 340).

The following references discuss nonparametric estimators including splines and are incorporated herein by reference: (1) C. de Boor, "A Practical Guide to Splines," Springer-Verlag (1978); (2) P. J. Green and B. W. Silverman, "Nonparametric Regression and Generalized Linear Models," Chapman and Hall (1994); (3) T. J. Hastie and R. J. Tibshirani, "Generalized Additive Model," Chapman and Hall (especially pp. 22–26) (1990); and (4) A. J. Miller, "Subset Selection in Regression," Chapman and Hall (1990).

Figure 4:
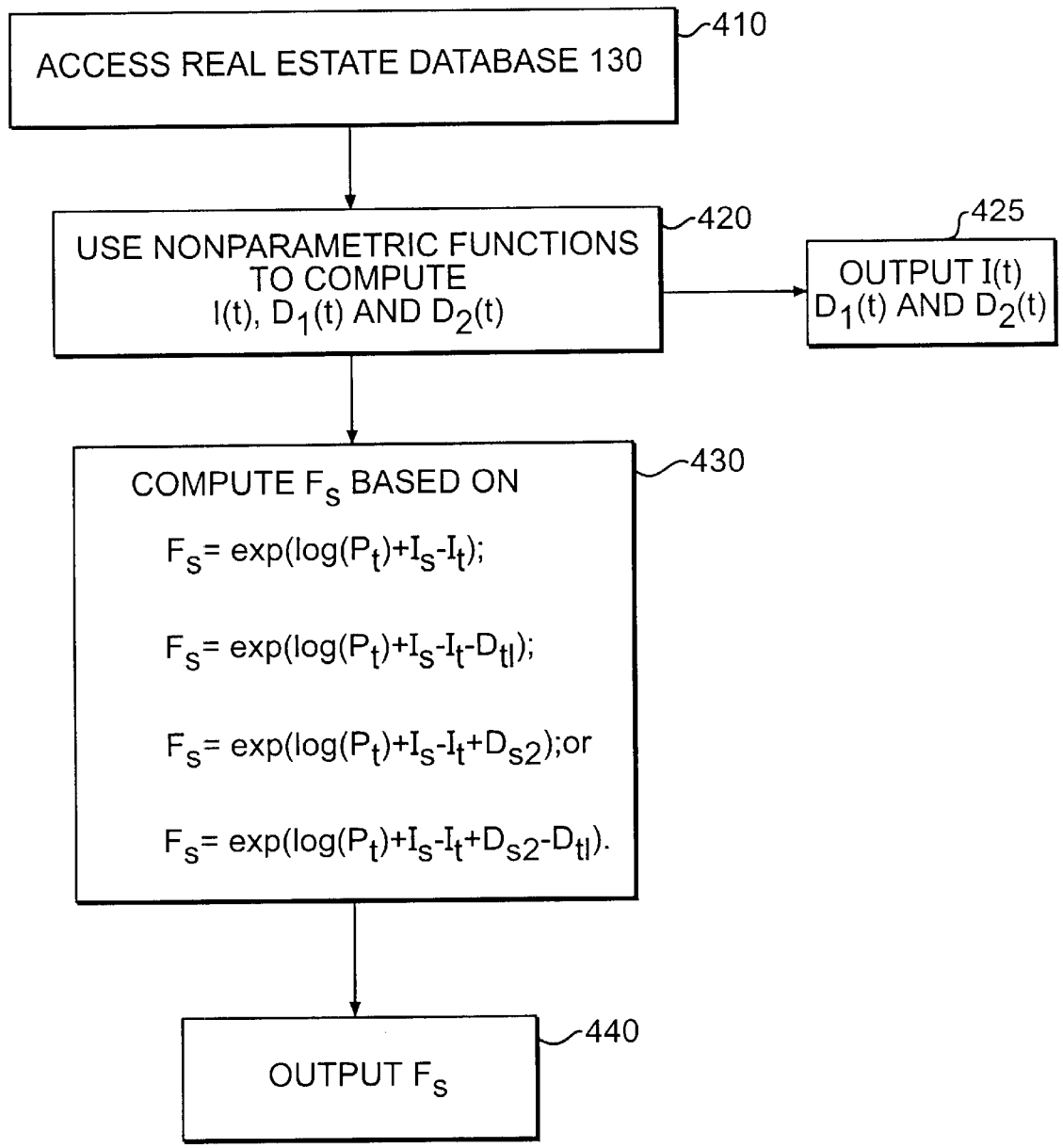
FIG. 4 a flow chart of the process for the property value estimation consistent with another implementation of the present invention.

FIG. 4 shows a flow chart illustrating another implementation of the present invention. This implementation of the present invention utilizes nonparametric estimation techniques to obviate the limitations and disadvantages of refinance bias adjusted repeat sales method for forecasting house price values.

Data for creating forecasts using the repeat transactions approach to valuing properties requires samples of two types: an estimation sample and an evaluation sample. The use of refinance transactions in forming repeat sales forecasts can improve forecasts by increasing the size of the estimation sample and the timeliness and the coverage of the evaluation sample provided that the differences between refinance and purchase transactions are adequately accounted for by the model.

In the first implementation of the present invention, the set of repeat sales regressors is augmented by a set of dummy variables. The dummy variables are created from interacting the date of transaction with the transaction type (refinance vs. purchase) for both transaction dates. Specifically, the model takes the form:

$$(12)\ \log(P_s/P_t)=I_s-I_t+d_{s2}R_{s2}-d_{t1}R_{t1}+v$$

Where $P_t$ is the first transaction price, $P_s$ is the second transaction price, $I_t$ is the price index value at time t, $I_s$ is the price index value at time s, $R_{t1}$ is one if the first transaction is a refinance and zero otherwise, $R_{s2}$ is one if the second transaction is a refinance and zero otherwise, $d_{t1}$ is coefficient representing the first transaction refinance bias, $d_{s2}$ is coefficient representing the second transaction refinance bias, and v is the error term.

In this implementation, I(t) is estimated using a nonparametric technique, such as using the linear spline function used in the second implementation of the present invention, thereby improving the forecast accuracy. Moreover, the incorporation of a nonparametric function (such as a spline function) to account for differences between refinance and purchase transactions can be added to the splined repeat sales model through the extension of equation 12 to include terms of the form given as follows:

(13) $\log(P_s/P_t) = I_s - I_t + D_2(s)R_{s2} - D_1(t)R_{t1} + u_i$ where the functions $D_1(t)$ and $D_2(t)$ which represent the refinance components are—in addition to I(t)—estimated using similar nonparametric techniques.

Similar to the implementation of refinance and purchase described above, in steps 410 and 420, I(t), $D_1(t)$ and $D_2(t)$ may be calculated based on equation (13) above, using the standard regression technique. For example, Arthur S. Goldberger, "Economic Theory," Chapters 4 and 5, John Wiley & Sons (1964), describes such a technique. The resulting I(t), $D_1(t)$ and $D_2(t)$ may be outputted on display 112 or to storage device 110 of FIG. 1 (step 425).

Furthermore, point forecasts at time s based on a transaction value at time t from this equation are variously made using the following equations (see the discussion above on equations (4)–(7)) (step 430):

(14) $F_s = \exp(\log(P_t) + I_s - I_t)$;

(15) $F_s = \exp(\log(P_t) + I_s - I_t - D_{t1})$;

(16) $F_s = \exp(\log(P_t) + I_s - I_t + D_{s2})$; or

(17) $F_s = \exp(\log(P_t) + I_s - I_t + D_{s2} - D_{t1})$, where $D_{t1} = D_1(t)$ and $D_{s2} = D_2(s)$ and wherein I(t), $D_1(t)$ and/or $D_2(t)$ are estimated using nonparametric techniques, such as using linear spline functions. The resulting $F_s$ may be outputted on display 112 or to storage device 110 of FIG. 1 (step 240).

It will be apparent to those skilled in the art that various modifications and variations can be made in the systems and methods of the present invention without departing from the scope or spirit of the invention. Other implementations of the invention will be apparent to those skilled in the art from consideration of the specification and practice of the invention disclosed herein. It is intended that the specification and examples be considered as exemplary only, with the true scope and spirit of the invention indicated by the following claims.

What is claimed is:

1. A method of estimating the value of a real estate property, comprising the steps of:

accessing a set of property value data for a plurality of properties, wherein the property value data corresponds to a transaction involving each of the plurality of properties;

determining, based on the set of property value data, a time-varying price index indicating a change of the values of the plurality of properties over time, wherein the time-varying price index takes into account a transaction type bias corresponding to different types of transactions involving each of the plurality of properties; and estimating the value of a real estate property based on the time-varying price index to allow use of the estimated value in evaluating a financial decision related to the real estate property.

2. The method of claim 1, further comprising the step of: determining a value of a predetermined property for a purchase transaction at a first time based on the time varying price index.

3. The method of claim 1, further comprising the step of: determining a value of a predetermined property for a refinance transaction at a first time based on the time varying price index.

4. The method of claim 2, wherein the step of determining a value of the predetermined property includes the substep of determining the value based on a value of the predetermined property from a purchase transaction at a second time, different from the first time.

5. The method of claim 2, wherein the step of determining a value of the predetermined property includes the substep of determining the value based on a value of the predetermined property from a refinance transaction at a second time, different from the first time.

6. The method of claim 3, wherein the step of determining a value of a predetermined property includes the substep of determining the value based on a value of the predetermined property from a purchase transaction at a second time, different from the first time.

7. The method of claim 3, wherein the step of determining a value of a predetermined property includes the substep of determining the value based on a value of the predetermined property from a refinance transaction at a second time, different from the first time.

8. The method of claim 5, wherein the step of determining a value of the predetermined property includes the substep of taking into account a transaction type bias arising from the use of the value from the refinance transaction at the second time.

9. The method of claim 6, wherein the step of determining a value of a predetermined property includes the substep of determining the value, taking into account a transaction type bias arising from determining the value of the predetermined property for a refinance transaction at the first time.

10. The method of claim 7, wherein the step of determining a purchase value includes the substep of taking into account a transaction type bias arising from the use of the value from the refinance transaction at the second time and a transaction type bias arising from determining the value of the predetermined property for a refinance transaction at the first time.

11. The method of claim 1, wherein the property value data corresponds to a refinance transaction or a purchase transaction.

12. The method of claim 1, wherein the different types of transactions include refinance and purchase transactions.

13. A method of estimating the value of a real estate property, comprising the steps of:

accessing a set of property value data for a plurality of properties, wherein the property value data corresponds to a transaction involving each of the plurality of properties;

determining, based on the set of property value data, a time-varying price index using a nonparametric technique, wherein the time-varying price index indicates a change of the values of the plurality of properties over time; and estimating the value of a real estate property based on the time-varying price index to allow use of the estimated value in evaluating a financial decision related to the real estate property.

14. The method of claim 13, wherein the property value data corresponds to a refinance transaction or a purchase transaction.

15. The method of claim 13, further comprising the step of:
determining a value of a predetermined property for a purchase transaction at a first time based on the time varying price index.

16. The method of claim 13, further comprising the step of:
determining a value of a predetermined property for a refinance transaction at a first time based on the time varying price index.

17. The method of claim 13, wherein the step of determining includes the substep of estimating the price index using a spline function.

18. The method of claim 13, wherein the step of determining includes the substep of estimating the price index using a linear spline function.

19. The method of claim 17, wherein the spline function includes one or more knot points.

20. The method of claim 19, wherein the placement of the knot points is dynamically determined by the set of property value data corresponding to the plurality of properties in the database.

21. The method of claim 20, further comprising the step of:
determining a value of a predetermined property for a purchase transaction at a first time based on the time varying price index.

22. The method of claim 20, further comprising the step of:
determining a value of a predetermined property for a refinance transaction at a first time based on the time varying price index.

23. A method of estimating the value of a real estate property, comprising the steps of:
accessing a set of property value data for a plurality of properties, wherein the property value data corresponds to a transaction involving each of the plurality of properties;
determining, based on the set of property value data, a time-varying price index using a nonparametric technique, wherein the time-varying price index indicates a change of the values of the plurality of properties over time and takes into account a transaction type bias corresponding to different types of transactions involving each of the plurality of properties; and
estimating the value of a real estate property based on the time-varying price index to allow use of the estimated value in evaluating a financial decision related to the real estate property.

24. The method of claim 23, wherein the property value data corresponds to a refinance transaction or a purchase transaction.

25. The method of claim 23, wherein the different types of transactions include refinaace and purchase transactions.

26. The method of claim 23, further comprising the step of:
determining a value of a predetermined property for a purchase transaction at a first time based on the time varying price index.

27. The method of claim 23, further comprising the step of:
determining a value of a predetermined property for a refinance transaction at a first time based on the time varying price index.

28. The method of claim 23, wherein the step of determining the price index includes the substep of estimating the price index using a spline function.

29. The method of claim 23, wherein the step of determining the price index includes the substep of estimating the price index using a linear spline function.

30. The method of claim 23, wherein the step of determining the price index includes the substep of estimating the transaction type bias between the property value data derived from refinance transactions and the property value data derived from purchase transactions using a nonparametric technique.

31. The method of claim 23, wherein the step of determining the price index includes the substep of estimating the transaction type bias between the property value data derived from refinance transactions and the property value data derived from purchase transactions using a spline function.

32. The method of claim 26, wherein the step of determining a value of the predetermined property includes the substep of determining the value based on a value of the predetermined property from a refinance transaction at a second time, different from the first time, and the determining a value of the predetermined property takes into account a transaction type bias arising from the use of the value from the refinance transaction at the second time.

33. The method of claim 27, wherein the step of determining a value of the predetermined property includes the substep of determining the value based on a value of the predetermined property from a purchase transaction at a second time, different from the first time, and the determining a value of the predetermined property takes into account a transaction type bias arising from determining the value of the predetermined property for a refinance transaction at the first time.

34. The method of claim 27, wherein the step of determining a value of the predetermined property includes the substep of determining the value based on a value of the predetermined property from a refinance transaction at a second time, different from the first time, and the determining a value of the predetermined property takes into account a transaction type bias arising from the use of the value from the refinance transaction at the second time and a transaction type bias arising from determining the value of the predetermined property for a refinance transaction at the first time.

35. The method of claim 32, wherein the step of determining the value of the predetermined property includes the substep of estimating using a nonparametric technique the transaction type bias arising from the use of the value from the refinance transaction at the second time.

36. The method of claim 33, wherein the step of determining the value of the predetermined property includes the substep of estimating using a nonparametric technique the transaction type bias arising from determining the value of the predetermined property for a refinance transaction at the first time.

37. The method of claim 34, wherein the step of determining the value of the predetermined property includes the substep of estimating using a nonparametric technique at least one of the transaction type bias arising from the use of the value from the refinance transaction at the second time and the transaction type bias arising from determining the value of the predetermined property for a refinance transaction at the first time.

38. A system for estimating the value of a real estate property, comprising:
means for accessing a set of property value data for a plurality of properties, wherein the property value data corresponds to a transaction involving each of the plurality of properties;

means for determining, based on the set of property value data, a time-varying price index indicating a change of the values of the plurality of properties over time, wherein the time-varying price index takes into account a transaction type bias corresponding to different types of transactions involving each of the plurality of properties; and means for estimating the value of a real estate property based on the time-varying price index to allow use of the estimated value in evaluating a financial decision related to the real estate property.

39. The system of claim 38, wherein the property value data corresponds to a refinance transaction or a purchase transaction.

40. The system of claim 38, wherein the different types of transactions include refinance and purchase transactions.

41. The system of claim 38, further comprising:

means for determining a value of a predetermined property for a purchase transaction at a first time based on the time varying price index.

42. The system of claim 38, further comprising:

means for determining a value of a predetermined property for a refinance transaction at a first time based on the time varying price index.

43. A system for estimating the value of a real estate property, comprising:

means for accessing a set of property value data for a plurality of properties, wherein the property value data corresponds to a transaction involving each of the plurality of properties;

means for determining, based on the set of property value data, a time-varying price index using a nonparametric technique, wherein the time-varying price index indicates a change of the values of the plurality of properties over time; and means for estimating the value of a real estate property based on the time-varying price index to allow use of the estimated value in evaluating a financial decision related to the real estate property.

44. The system of claim 43, wherein the property value data corresponds to a refinance transaction or a purchase transaction.

45. The system of claim 43, further comprising:

means for determining a value of a predetermined property for a purchase transaction at a first time based on the time varying price index.

46. The system of claim 43, further comprising:

means for determining a value of a predetermined property for a refinance transaction at a first time based on the time varying price index.

47. A system for estimating the value of a real estate property, comprising:

means for accessing a set of property value data for a plurality of properties, wherein the property value data corresponds to a transaction involving each of the plurality of properties;

means for determining, based on the set of property value data, a time-varying price index using a nonparametric technique, wherein the time-varying price index indicates a change of the values of the plurality of properties over time and takes into account a transaction type bias corresponding to different types of transactions involving each of the plurality of properties; and means for estimating the value of a real estate property based on the time-varying price index to allow use of the estimated value in evaluating a financial decision related to the real estate property.

48. The system of claim 47, wherein the property value data corresponds to a refinance transaction or a purchase transaction.

49. The system of claim 47, wherein the different types of transactions include refinance and purchase transactions.

50. The system of claim 47, further comprising:

means for determining a value of a predetermined property for a purchase transaction at a first time based on the time varying price index.

51. The system of claim 47, further comprising:

means for determining a value of a predetermined property for a refinance transaction at a first time based on the time varying price index.

52. An article of manufacture capable of configuring a data processor to estimate the value of a real estate property, the article comprising program code to cause the data processor to perform the steps of:

accessing a set of property value data for a plurality of properties, wherein the property value data corresponds to a transaction involving each of the plurality of properties;

determining, based on the set of property value data, a time-varying price index indicating a change of the values of the plurality of properties over time, wherein the time-varying price index takes into account a transaction type bias corresponding to different types of transactions involving each of the plurality of properties; and estimating the value of a real estate property based on the time-varying price index to allow use of the estimated value in evaluating a financial decision related to the real estate property.

53. The article of manufacture of claim 52, wherein the property value data corresponds to a refinance transaction or a purchase transaction.

54. The article of manufacture of claim 52, wherein the different types of transactions include refinance and purchase transactions.

55. The article of manufacture of claim 52, further causing the data processor to perform the step of:

determining a value of a predetermined property for a purchase transaction at a first time based on the time varying price index.

56. The article of manufacture of claim 52, further causing the data processor to perform the step of:

determining a value of a predetermined property for a refinance transaction at a first time based on the time varying price index.

57. An article of manufacture capable of configuring a data processor to estimate the value of a real estate property, the article comprising program code to cause the data processor to perform the steps of:

accessing a set of property value data for a plurality of properties, wherein the property value data corresponds to a transaction involving each of the plurality of properties;

determining, based on the set of property value data, a time-varying price index using a nonparametric technique, wherein the time-varying price index indicates a change of the values of the plurality of properties over time; and estimating the value of a real estate property based on the time-varying price index to allow use of the estimated value in evaluating a financial decision related to the real estate property.

58. The article of manufacture of claim 57, wherein the property value data corresponds to a refinance transaction or a purchase transaction.

59. The article of manufacture of claim 57, further causing the data processor to perform the step of:
   determining a value of a predetermined property for a purchase transaction at a first time based on the time varying price index.

60. The article of manufacture of claim 57, further causing the data processor to perform the step of:
   determining a value of a predetermined property for a refinance transaction at a first time based on the time varying price index.

61. An article of manufacture capable of configuring a data processor to estimate the value of a real estate property, the article comprising program code to cause the data processor to perform the steps of:
   accessing a set of property value data for a plurality of properties, wherein the property value data corresponds to a transaction involving each of the plurality of properties;
   determining, based on the set of property value data, a time-varying price index using a nonparametric technique, wherein the time-varying price index indicates a change of the values of the plurality of properties over time and takes into account a transaction type bias corresponding to different types of transactions involving each of the plurality of properties; and
   estimating the value of a real estate property based on the time-varying price index to allow use of the estimated value in evaluating a financial decision related to the real estate property.

62. The article of manufacture of claim 61, wherein the property value data corresponds to a refinance transaction or a purchase transaction.

63. The article of manufacture of claim 61, wherein the different types of transactions include refinance and purchase transactions.

64. The article of manufacture of claim 61, further causing the data processor to perform the step of:
   determining a value of a predetermined property for a purchase transaction at a first time based on the time varying price index.

65. The article of manufacture of claim 61, further causing the data processor to perform the step of:
   determining a value of a predetermined property for a refinance transaction at a first time based on the time varying price index.

66. A method for use with a real estate property, comprising the steps of:
   accessing a set of property value data for a plurality of properties, wherein the property value data corresponds to a transaction involving each of the plurality of properties;
   determining, based on the set of property value data, a time-varying price index indicating a change of the values of the plurality of properties over time, wherein the time-varying price index takes into account a transaction type bias corresponding to different types of transactions involving each of the plurality of properties;
   estimating the value of a real estate property based on the time-varying price index; and
   evaluating a financial decision related to the real estate property based on the estimated value.

67. The method of claim 66, wherein the property value data corresponds to a refinance transaction or a purchase transaction.

68. The method of claim 66, wherein the different types of transactions include refinance and purchase transactions.

69. A method for use with a real estate property, comprising the steps of:
   accessing a set of property value data for a plurality of properties, wherein the property value data corresponds to a transaction involving each of the plurality of properties;
   determining, based on the set of property value data, a time-varying price index using a nonparametric technique, wherein the time-varying price index indicates a change of the values of the plurality of properties over time;
   estimating the value of a real estate property based on the time-varying price index; and
   evaluating a financial decision related to the real estate property based on the estimated value.

70. The method of claim 69, wherein the property value data corresponds to a refinance transaction or a purchase transaction.

71. A method for use with a real estate property, comprising the steps of:
   accessing a set of property value data for a plurality of properties, wherein the property value data corresponds to a transaction involving each of the plurality of properties;
   determining, based on the set of property value data, a time-varying price index using a nonparametric technique, wherein the time-varying price index indicates a change of the values of the plurality of properties over time and takes into account a transaction type bias corresponding to different types of transactions involving each of the plurality of properties;
   estimating the value of a real estate property based on the time-varying price index; and
   evaluating a financial decision related to the real estate property based on the estimated value.

72. The method of claim 71, wherein the property value data corresponds to a refinance transaction or a purchase transaction.

73. The method of claim 71, wherein the different types of transactions include refinance and purchase transactions.

74. The method of claim 66, further comprising determining a value of a predetermined property for a purchase transaction at a first time based on the time-varying price index.

75. The method of claim 74, wherein determining a value of a predetermined property includes determining the value based on a value of the predetermined property from a purchase transaction at a second time, different from the first time.

76. The method of claim 74, wherein determining a value of a predetermined property includes determining the value based on a value of the predetermined property from a refinance transaction at a second time, different from the first time.

77. The method of claim 76, wherein determining a value of a predetermined property includes taking into account a transaction type bias arising from the use of the value from the refinance transaction at the second time.

78. The method of claim 66, further comprising determining a value of a predetermined property for a refinance transaction at a first time based on the time-varying price index.

79. The method of claim 78, wherein determining a value of a predetermined property includes determining the value based on a value of the predetermined property form a purchase transaction at a second time, different from the first time.

80. The method of claim 78, wherein determining a value of a predetermined property includes determining the value based on a value of the predetermined property from a refinance transaction at a second time, different from the first time.

81. The method of claim 79, wherein determining a value of a predetermined property includes determining the value, taking into account a transaction type bias arising from determining the value of the predetermined property for a refinance transaction at the first time.

82. The method of claim 80, wherein determining a purchase value includes taking into account a transaction type bias arising from the use of the value from the refinance transaction at the second time and a transaction type bias arising from determining the value of the predetermined property for a refinance transaction at the first time.

83. The method of claim 69, further comprising determining a value of a predetermined property for a purchase transaction at a first time based on the time-varying price index.

84. The method of claim 69, further comprising determining a value of a predetermined property for a refinance transaction at a first time based on the time-varying price index.

85. The method of claim 69, wherein determining a time-varying price index includes estimating the price index using a linear spline function.

86. The method of claim 69, wherein determining a time-varying price index includes estimating the price index using a spline function.

87. The method of claim 86, wherein the spline function includes one or more knot points.

88. The method of claim 87, wherein the placement of the knot points is dynamically determined by the set of property value data corresponding to the plurality of properties.

89. The method of claim 88, further comprising determining a value of a predetermined property for a purchase transaction at a first time based on the time-varying price index.

90. The method of claim 88, further comprising determining a value of a predetermined property for a refinance transaction a first time based on the time-varying price index.

91. The method of claim 71, wherein determining the time-varying price index includes estimating the price index using a spline function.

92. The method of claim 71, wherein determining the time-varying price index includes estimating the price index using a linear spline function.

93. The method of claim 71, wherein determining the time-varying price index includes estimating a transaction type bias between the property value data derived from refinance transactions and the property value data derived from purchase transactions using a nonparametric technique.

94. The method of claim 71, wherein determining the time-varying price index includes estimating a transaction type bias between the property value data derived from refinance transactions and the property value data derived from purchase transactions using a spline function.

95. The method of claim 71, further comprising determining a value of a predetermined property for a purchase transaction at a first time based on the time-varying price index.

96. The method of claim 95, wherein determining a value of a predetermined property includes determining the value based on a value of the predetermined property from a refinance transaction at a second time, different from the first time, and the determining a value of the predetermined property takes into account a transaction type bias arising from the use of the value from the refinance transaction at the second time.

97. The method of claim 96, wherein determining a value of a predetermined property includes estimating using a nonparametric technique the transaction type bias arising from the use of the value from the refinance transaction at the second time.

98. The method of claim 71, further comprising determining a value of a predetermined property for a refinance transaction at a first time based on the time-varying price index.

99. The method of claim 98, wherein determining a value of a predetermined property includes determining the value based on a value of the predetermined property from a purchase transaction at a second time, different from the first time, and the determining a value of the predetermined property takes into account a transaction type bias arising from determining the value of the predetermined property for a refinance transaction at the first time.

100. The method of claim 99, wherein determining the value of the predetermined property includes estimating using a nonparametric technique the transaction type bias arising from determining the value of the predetermined property for a refinance transaction at the first time.

101. The method of claim 98, wherein determining a value of a predetermined property includes determining the value based on a value of the predetermined property from a refinance transaction at a second time, different from the first time, and the determining a value of the predetermined property takes into account a transaction type bias arising from the use of the value from the refinance transaction at the second time and a transaction type bias arising from determining the value of the predetermined property for a refinance transaction at the first time.

102. The method of claim 101, wherein determining a value of a predetermined property includes estimating using a nonparametric technique at least one of the transaction type bias arising from the use of the value from the refinance transaction at the second time and the transaction type bias arising from determining the value of the predetermined property for a refinance transaction at the first time.

* * * * *